United States Patent [19]

Hayashi

[11] Patent Number: 4,878,233

[45] Date of Patent: Oct. 31, 1989

[54] DATA PATTERN SYNCHRONIZER

[75] Inventor: Mishio Hayashi, Saitama, Japan

[73] Assignee: Advantest Corporation, Tokyo, Japan

[21] Appl. No.: 282,066

[22] Filed: Dec. 9, 1988

[30] Foreign Application Priority Data

Dec. 21, 1987 [JP] Japan ................................ 62-324831

[51] Int. Cl.⁴ .............................................. H04L 7/00
[52] U.S. Cl. .................................... 375/116; 375/115;
364/717
[58] Field of Search .................... 375/115, 1, 111, 108,
375/113, 114, 116, 106; 370/107; 328/63;
331/78; 364/717; 307/269

[56] References Cited

U.S. PATENT DOCUMENTS

| | | | |
|---|---|---|---|
| 3,648,237 | 3/1972 | Frey, Jr. et al. | 375/115 |
| 4,168,529 | 9/1979 | Tomlinson | 364/728 |
| 4,171,513 | 10/1979 | Otey et al. | 375/115 |
| 4,590,601 | 5/1986 | Beeman | 375/115 |
| 4,791,653 | 12/1988 | McFarland et al. | 370/107 |

Primary Examiner—Robert L. Griffin
Assistant Examiner—Stephen Chin
Attorney, Agent, or Firm—Staas & Halsey

[57] ABSTRACT

A clock regenerator generates a clock Co synchronized with an input data pattern and a data pattern generator generates a reference data pattern in synchronization with the clock Co. The reference data pattern and the input data pattern are compared by a data disagreement detector to detect disagreement therebetween. The disagreement detection signal thus obtained is frequency divided by a 1/m-frequency divider and its frequency-divided output is further frequency divided by a 1/-n frequency divider. The frequency-divided output of the 1/n-frequency divider is provided to a bistable flip-flop, placing it in one stable state. The logical sum of the output of the flip-flop in the one stable state and the 1/m-frequency divider is obtained, as an inhibit pulse, by an AND gate, and the inhibit pulse is applied to another AND gate to inhibit the passage therethrough of the clock Co to the data pattern generator, delaying the generation of the reference data pattern in the data pattern generator. The 1/m-frequency divider, the 1/n-frequency divider and the flip-flop are reset every k pulses of the clock Co.

5 Claims, 5 Drawing Sheets

DATA PATTERN SYNCHRONIZER

BACKGROUND OF THE INVENTION

The present invention relates to a data pattern synchronizer for providing synchronization with an input data pattern in an apparatus which measures a transmission error rate of a digital transmission system.

The transmission error rate of a digital transmission system is usually measured in such a manner as described below. At the input side of the digital transmission system to be measured, a data pattern for measurement, which is a recurrence of a fixed pattern of a predetermined bit length, is obtained from a data pattern generator and is then supplied to the digital transmission system. At the output side of the digital transmission system, a reference data pattern similar to the data pattern applied to the digital transmission system is obtained from a data pattern generator similar to that at the input side. The reference data pattern is compared, on a bitwise basis, with the data pattern transmitted over the digital transmission system and having developed errors by the transmission, by which the errors of the transmitted data pattern are detected, and the number of such errors per unit bit length is counted.

In this instance, if the reference data pattern available from the data pattern generator at the output side of the digital transmission system is not synchronized with the input data pattern transmitted over the transmission system, it would be determined that the input data pattern has an error, even if the data is error-free. To avoid this, the reference data pattern generator is provided in association with a data pattern synchronizer for synchronizing the reference data pattern with the input data pattern, and errors of the input data pattern are counted in a state in which the reference data pattern is held in synchronism with the input data pattern.

Conventionally, the data pattern synchronizer for such an error rate measuring apparatus has such an arrangement as shown in FIG. 1. An input data pattern Di containing errors, transmitted over the digital transmission system, is provided via an input terminal 11 to a data comparator 22 which forms a data disagreement detector 21. A clock regenerator 24 regenerates, in synchronism with the input data pattern Di, a clock Co of frequency equal to its bit rate. The clock Co is applied to an AND gate 25 and its output clock Cg is provided to a data pattern generator 26, from which a reference data pattern Dr of exactly the same contents as the original contents of the input data pattern is obtained bit by bit for each pulse of the clock Cg. The reference data pattern Dr is supplied to the data comparator 22.

The data comparator 22 compares the input data pattern Di and the reference data pattern Dr on a bitwise basis and yields a data disagreement detection signal Sd of an NRZ waveform which goes low-level or high-level depending on whether the both data patterns agree with each other or not. The detection signal Sd is applied to an AND gate 23, which is also supplied with the clock Co from the clock regenerator 24. The AND gate 23, that is, the data disagreement detector 21 yields a data disagreement detection pulse Pe of the same pulse width as that of the clock Co when the input data pattern Di and the reference data pattern Dr do not agree with each other.

The data disagreement detection pulse Pe is provided to an output terminal 12. The clock Co from the clock regenerator 24 is supplied to a 1/k-frequency divider 31 (where k is a positive integer), in which it is frequency divided down to 1/k and from which a positive output pulse Pk is provided every k periods of the clock Co. The output pulse Pk is applied to an OR gate 27 and its output pulse Po is applied to a reset terminal R of a 1/l-frequency divider 28, resetting it every k periods of the clock Co. On the other hand, the data disagreement detection pulse Pe is applied to and frequency divided by the frequency divider 28 down to 1/l (where l is a positive integer smaller than k). When l shots of data disagreement detection pulses Pe have been produced within the k periods of the clock Co as a result, it is determined that the reference data pattern Dr is not synchronized with the input data pattern Di, and the frequency divider 28 yields an output pulse Pl. That is to say, it is presumed that the transmission error rate of the digital transmission system will not exceed a rate l/k, and when the rate of detected errors which are provided to the output terminal 12 exceeds the rate l/k, it is determined that the reference data pattern Dr is not synchronized with the input data pattern Di.

The output pulse Pl of the frequency divider 28 is applied to an inhibit pulse generator 29, from which a positive inhibit pulse Pi is generated. The inhibit pulse Pi is inverted and then applied to the AND gate 25 to inhibit the supply of the clock Co to the data pattern generator 26 for a period of the pulse width $\tau_D$ of the inhibit pulse Pi, and consequently, the generation of the reference data pattern from the data pattern generator 26 is stopped for the period $\tau_D$. At the same time, the inhibit pulse Pi from the inhibit pulse generator 29 is applied to a reset terminal R of the frequency divider 31 and the OR gate 27, resetting the frequency dividers 31 and 28 when the supply of the clock Co to the data pattern generator 26 is inhibited.

In this way, the supply of the clock Co to the data pattern generator 26 is inhibited for the period $\tau_D$, during which the generation of the reference data pattern Dr from the data pattern generator 26 is suspended. By this, the phase of the reference data pattern Dr available from the data pattern generator 26 is delayed by the number of inhibited pulses of the clock Co, and such a phase correction is repeated upon each generation of the inhibit pulse Pi from the inhibit pulse generator 29, by which the reference data pattern Dr is synchronized with the input data pattern Di.

However, if the number of pulses of the clock Co which are inhibited by the inhibit pulse Pi, that is, the number of bits by which the reference data pattern Dr is delayed for each phase correction, is fixed to a specific number, the reference data pattern Dr may not be synchronized with the input data pattern Di in some cases. Consider, for example, the case where the data pattern is a PN pattern $2^4-1$ which is a recurrence of a 15-bit pattern and the reference data pattern Dr is delayed three bits by each phase correction. When the reference data pattern Dr initially leads the input data pattern Di by two bits as indicated by STATE 1 in FIG. 2 in which data of the 15-bit pattern are represented by A, B, C, . . . O, the reference data pattern Dr will be put out of phase with the input data pattern Di, by individual phase corrections, as indicated by STATE 2, 3, 4, 5, 1, . . . in FIG. 2. No matter how many times the phase correction may be effected, the reference data pattern Dr will not be synchronized with the input data pattern Di. To avoid this, provision must be made so that the number of pulses of the clock Co which are inhibited by each inhibit pulse Pi will not be prime factors of the data pattern length nor will it be their integral multiples. Alternatively, the inhibit pulse generator 29 may be arranged so that the pulse width $\tau_D$ of the inhibit pulse Pi is modulated randomly within a range larger than one period of the clock Co.

At any rate, according to the above-described conventional data pattern synchronizer, the inhibit pulse generator 29 does not yield the inhibit pulse Pi until 1 data disagreement detection pulses Pe are counted in the frequency divider 28, and consequently, the cycle period of phase correction of the reference data pattern Dr is long. In other words, the prior art synchronizer consumes much time for synchronizing the reference data pattern Dr with the input data pattern Di. In addition, the random modulation of the pulse width of the inhibit pulse Pi will bring about random changes in the number of bits by which the reference data pattern Dr is delayed for each phase correction, and hence it is difficult to predict how many times the phase correction must be effected to establish synchronization. Furthermore, the additional provision of a special circuit to the inhibit pulse generator 29 for randomly modulating the pulse width of the inhibit pulse Pi will introduce complexity in the circuit arrangement of the synchronizer.

SUMMARY OF THE INVENTION

It is therefore an object of the present invention to provide a data pattern synchronizer which affords reduction of the time for establishing synchronization between a reference data pattern and an input data pattern, permits accurate computation of a maximum time necessary for the synchronization and is simple in circuit arrangement.

The data pattern synchronizer of the present invention includes, in addition to a data pattern generator which responds to a clock to generate a reference data pattern and a data disagreement detector which compares an input data pattern to be measured for its error rate and the reference data pattern on a bitwise basis and yields a data disagreement detection pulse when they do not agree with each other, a first frequency divider which frequency divides the clock down to 1/k (where k is a positive integer), a second frequency divider which is reset by the output pulse of the first frequency divider and frequency divides the data disagreement detection pulse down to 1/m (where m is a positive integer smaller than k), a third frequency divider which is reset by the output pulse of the first frequency divider and frequency divides the output pulse of the second frequency divider down to 1/n (where n is a positive integer smaller than k bearing relationship $m \cdot n < k$), a flip-flop which is placed by the output pulse of the third frequency divider in a first stable state and switched by the output pulse of the first frequency divider to a second stable state, a first gate circuit which obtains as an inhibit pulse the AND of the output pulse of the second frequency divider and the output signal of the flip-flop, and a second gate circuit which responds to the inhibit pulse to inhibit the supply of the clock to the data pattern generator.

In such a data pattern synchronizer of the present invention, when $m \cdot n$ data disagreement detection pulses are produced within k periods of the clock after the generation of the output pulse from the first frequency divider, it is determined that the reference data pattern is not synchronized with the input data pattern, and the flip-flop enters the first stable state. Thereafter, each time m data disagreement detection pulses are yielded, the first gate circuit provides an inhibit pulse and the phase of the reference data pattern is corrected accordingly. Since such a phase correction is carried out a plurality of times at short time intervals within the k periods of the clock, the reference data pattern can be synchronized with the input data pattern in a short time. In this instance, the pulse width of the inhibit pulse is selected so that the number of bits for which the reference data pattern is delayed by one phase correction is one or a specific number dependent on the relationship with the pattern length of the data pattern. This ensures the provision of synchronization and permits accurate computation of a maximum time for establishing the synchronization.

When the reference data pattern has once been synchronized with the input data pattern, no inhibit pulse will be provided from the first gate circuit unless burst errors in the input data pattern occur in succession over a $m \cdot n$ bit period; namely, there is no possibility of the reference data pattern being phase-corrected and becoming asynchronous with the input data pattern. In other words, unless the errors in the input data pattern exceeds an error rate of m/k until the first frequency divider yields the next subsequent output pulse, and unless the errors in the input data pattern exceeds an error rate of $m \cdot n/k$ after the generation of the next frequency-divided output from the first frequency divider, the first gate circuit will not yield any inhibit pulse, and consequently, no phase correction of the reference data pattern will take place and synchronization will be maintained between the reference data pattern and the input data pattern.

DESCRIPTION OF THE PREFERRED EMBODIMENTS

Figure 3:
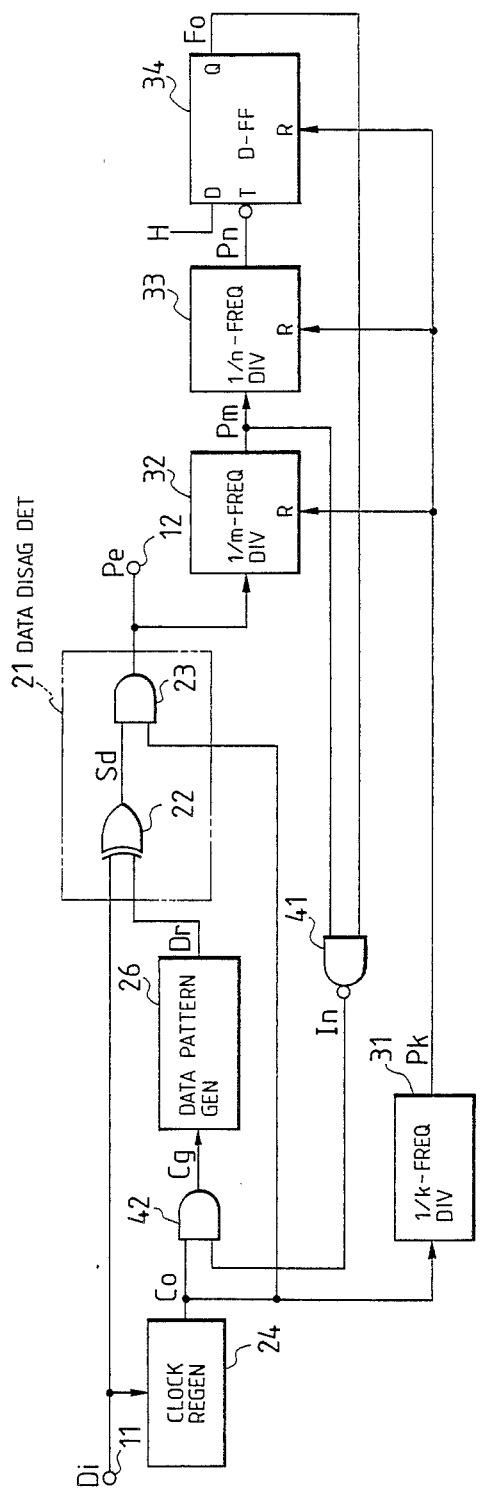
FIG. 3 is a block diagram illustrating an embodiment of the data pattern synchronizer of the present invention.
Figure 4:
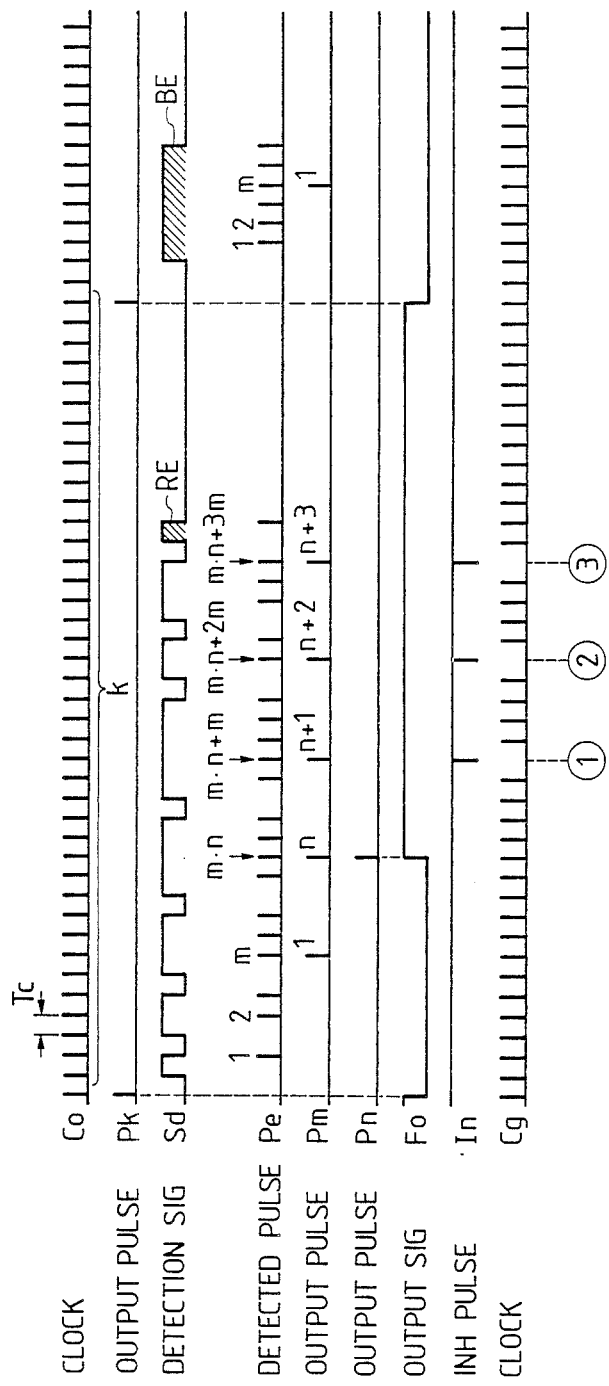
FIG. 4 is a timing chart showing, by way of example, output signal waveforms occurring at respective parts in the embodiment depicted in FIG. 3.

FIG. 3 illustrates an embodiment of the data pattern synchronizer of the present invention and FIG. 4 shows, by way of example, output signal waveforms occurring at respective parts therein.

The input data pattern Di containing errors, transmitted over the digital transmission system, is provided via the input terminal 11 to the data comparator 22 which forms the data disagreement detector 21. The clock regenerator 24 regenerates, in synchronization with the input data pattern Di, the clock Co of a frequency equal to the bit rate of the input data pattern Di. The clock Co is applied to an AND gate 42, and its output clock Cg is provided to the data pattern generator 26, from which the reference data pattern Dr of exactly the same contents as the original contents of the input data pattern Di is provided bit by bit for each pulse of the clock Cg. The reference data pattern Dr is supplied to the data comparator 22.

The data comparator 22 compares the input data pattern Di and the reference data pattern Dr on a bitwise basis and yields the data disagreement detection signal Sd of an NRZ waveform which goes low-level or high-level depending on whether or not the input data pattern Di and the reference data pattern Dr agree with each other. The detection signal Sd is applied to one input of the AND gate 23, which is supplied at the other input with the clock Co from the clock regenerator 23. The AND gate 23, that is, the data disagreement detector 21 provides to the output terminal 12 the data disagreement detection pulse Pe of the same pulse width as that of the clock Co when the input data pattern Di and the reference data pattern Dr are not in agreement with each other.

The clock Co from the clock regenerator 24 is also provided to the frequency divider 31, wherein it is frequency divided down to 1/k (where k is a positive integer), yielding the output Pk every k periods of the clock Co.

The output pulse Pk of the frequency divider 31 is applied to a reset terminal R of a frequency divider 32, resetting it every k periods of the clock Co. The data disagreement detection pulse Pe is applied to the frequency divider 32, wherein it is frequency divided down to 1/m (where m is a positive integer smaller than k) and from which an output pulse Pm is provided each time m data disagreement detection pulses Pe are generated within k periods of the clock Co after the generation of the output pulse Pk from the frequency divider 31.

Figure 1:
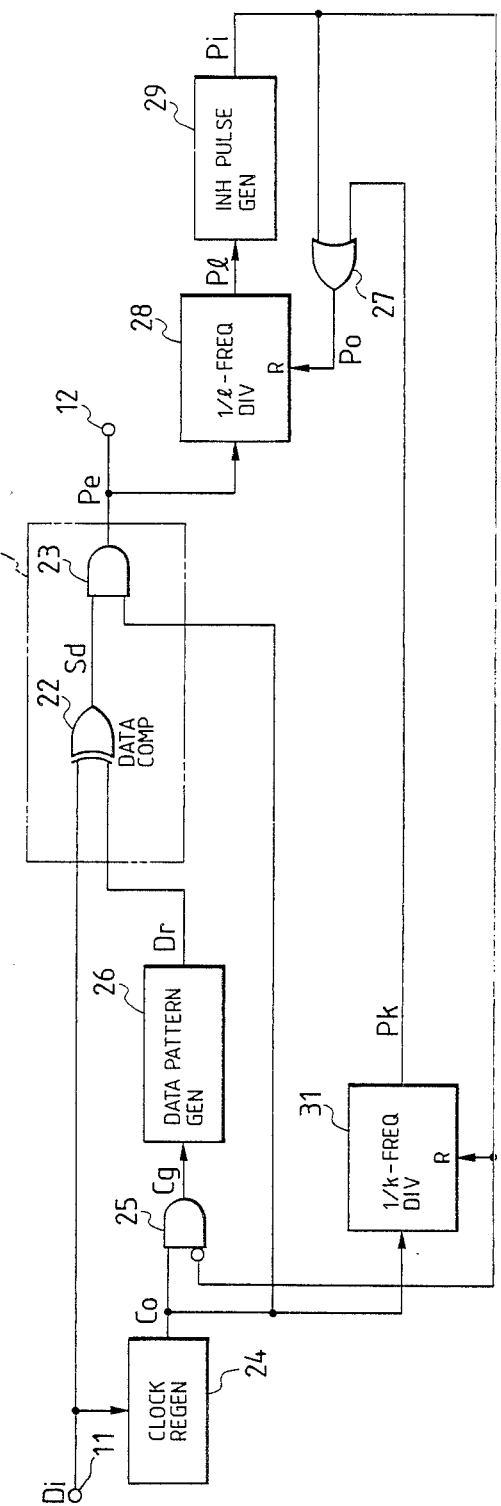
FIG. 1 is a block diagram illustrating a conventional data pattern synchronizer.

Further, the output pulse Pk of the frequency divider 31 is also applied to a reset terminal R of a frequency divider 33, resetting it every k periods of the clock Co. The output pulse Pm of the frequency divider 32 is applied to the frequency divider 33, wherein it is frequency divided down to 1/n (where n is a positive integer which is smaller than k and selected so that m·n<k). As a result of this, when n or more output pulses Pm are obtained from the frequency divider 32 within the k periods of the clock Co after the generation of the output pulse Pk from the frequency divider 31, that is, when m·n or more data disagreement detection pulses Pe are produced within the k periods of the clock Co after the generation of the output pulse Pk from the frequency divider 31, it is determined that the reference data pattern Dr is not synchronized with the input data pattern Di. When n output pulses Pm have been provided, that is, m·n data disagreement detection pulses Pe have been generated, the frequency divider 33 yields the output pulse Pn. The product m·n corresponds to the value 1 in the prior art described previously with regard to FIG. 1 and is selected greater than the number of burst errors. The value m can be set to 2 when presumable errors in the transmission system are mostly random errors, but when burst errors also occur, it is set to a suitable value greater than 2.

The output pulse Pn of the frequency divider 33 is applied to a trigger terminal T of a D-type flip-flop 34, which is also supplied at its data terminal D with a high-level voltage H. By the output pulse Pn the D-type flip-flop 34 is placed in its first stable state and its output signal Fo is made high-level. The D-type flip-flop 34 remains in the first stable state until it is supplied at its reset terminal R with the output pulse Pk of the frequency divider 31 next. Upon application thereto of this output pulse Pk, the D-type flip-flop 34 is switched to its second stable state and its output signal is made low-level. Consequently, when m·n or more data disagreement detection pulses Pe are provided within the k periods of the clock Co after the generation of the output pulse Pk from the frequency divider 31, the output signal Fo remains high-level thereafter until the frequency divider 31 yields the output pulse Pk next.

The output signal Fo of the D-type flip-flop 34 and the output pulse Pm of the frequency divider 32 are provided to a NAND gate 41. When supplied with the output pulse Pm during the high-level period of the output signal Fo, the NAND gate 41 yields a negative inhibit pulse In, which is applied to the AND gate 42. During the period of the pulse width of the inhibit pulse In the supply of the clock Co to the data pattern generator 26 is inhibited, and consequently, the data pattern generator 26 is stopped from generating the reference data pattern Dr. In this example the pulse width of the inhibit pulse In which is the output of the NAND gate 41 is equal to the pulse width of the output pulse Pm of the frequency divider 32, and this pulse width is set to a width in which, for instance, one clock pulse Co is skipped.

Thus, one pulse of the clock Co which is provided to the data pattern generator 26 is skipped over and the generation of the reference data pattern Dr by the data pattern generator 26 is stopped by one bit accordingly. In consequence, the reference data pattern Dr available from the data pattern generator 26 is delayed by one bit. Such a phase correction is performed each time the inhibit pulse In is produced by the NAND gate 41, whereby the reference data pattern Dr is synchronized with the input data pattern Di.

By selecting the value of m to be sufficiently smaller than k, the phase correction can be carried out a plurality of times at short time intervals during the high-level period of the output signal Fo of the D-type flip-flop 34 within the k periods of the clock Co, and consequently, the synchronization can be established in a short time. FIG. 4 shows an example in which the reference data pattern Dr initially leads the input data pattern Di by three bits and is synchronized with the latter by three phase corrections ①, ② and ③ within the k periods of the clock Co.

In general, where the reference data pattern Dr is delayed one bit by one phase correction as mentioned above, a maximum period of time for establishing synchronization can be presumed as follows:

$$Ts = Tc \times m \div P \times N \tag{1}$$

where Tc is the period of the clock Co, P is the probability of disagreement between the input data pattern Di and the reference data pattern Dr when they are asynchronous, and N is the pattern length (in bit) of the data pattern. For example, in the case where the data pattern is a PN pattern $2^{23}-1$ which is the recurrence of a 8388607 bit long pattern, $k=2^{11}=2048$, $m=2^2=4$, $n=2^3=8$, the frequency of the clock Co is 50 MHz, that is, $Tc=20\times10^{-9}$ sec, and $P=0.4$, the maximum time for providing synchronization can be predicted as follows:

$$Ts = 20 \times 10^{-9} \sec \times 4 \div 0.4 \times 8388607 = 1.68 \text{ sec.}$$

In FIG. 4, hatched high-level portions RE and BE in the detection signal Sd after providing synchronization by the phase correction ③ are detected components of a random error and a burst error in the input data pattern Di, respectively.

When the reference data pattern Dr has once been synchronized with the input data pattern Di by the phase correction ③, even if random errors occur in the input data pattern Di, the NAND gate 41 does not yield the inhibit pulse In unless the error rate exceeds m/n while the output signal Fo of the flip-flop 34 is high-level and unless the error rate exceeds m·n/k after the output signal Fo becomes low-level. Consequently, as long as such conditions are satisfied, there is no possibility that the reference data pattern Dr from the data pattern generator 26, once synchronized with the input data pattern Di, is unnecessarily corrected in phase and becomes asynchronous therewith. Also as for burst errors in the input data pattern Di, the NAND gate 41 does not yield the inhibit pulse In, either, unless they occur in succession in excess of m·n bits.

Figure 2:
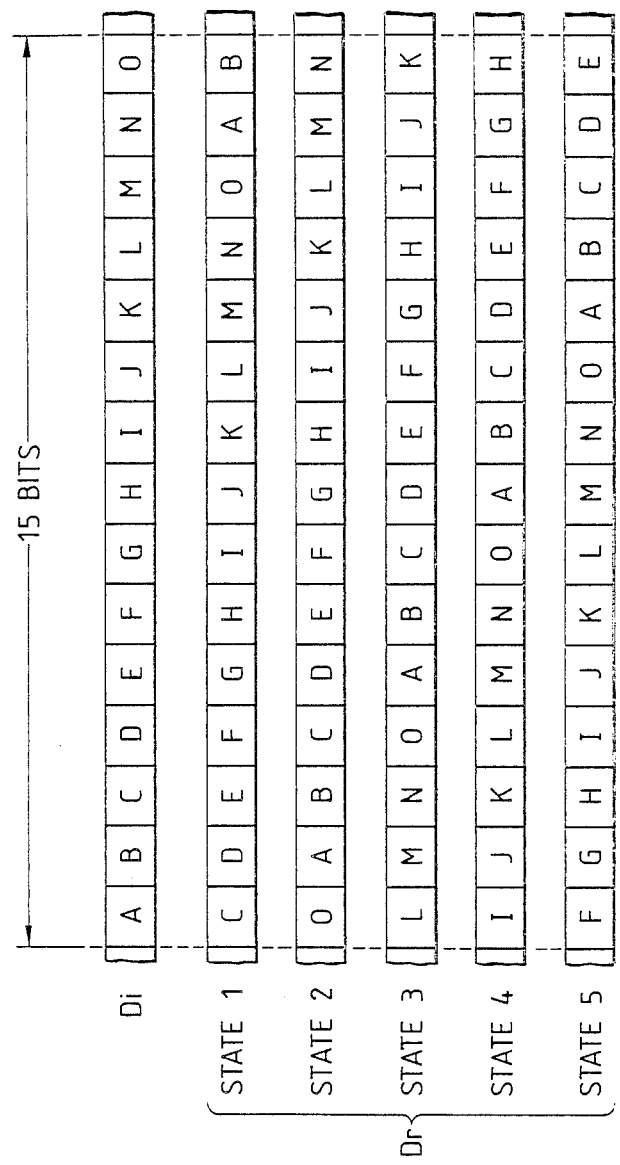
FIG. 2 is a diagram showing the phase relationship between an input data pattern and a reference data pattern, for explaining the conventional data pattern synchronizer.

In the above example, the pulse width of the inhibit pulse In is set to a width in which one clock pulse Co is skipped over and the reference data pattern Dr is delayed by one bit for each phase correction. In this instance, synchronization is provided without fail. Also when the data pattern is a PN pattern $2^{4-1}$ bit long, for example, synchronization is similarly established unless the number of bits for which the reference data pattern Dr is delayed by one phase correction is 3, 5, or their integral multiples 6, 9, 10, 12 and 15, that is, if the above-said number of bits is 2, 4, 7, 8, 11, 13, or 14, as will be seen from FIG. 2. When the data pattern is a recurrence of a 12-bit long pattern, synchronization is provided unless the number of bits for which the reference data pattern Dr is delayed by one phase correction is 2, 3, or their integral multiples 4, 6, 8, 9, 10 and 12, that is, the above number of bits is 5, 7, or 11. In other words, synchronization is surely established if the number of bits for which the reference data pattern Dr is delayed by one phase correction is not a prime factor of the pattern length of the data pattern or its integral multiple.

The number of clock pulses Co which are skipped over by the inhibit pulse In, that is, the number of bits for which the reference data pattern Dr is delayed by one phase correction, may therefore be set to a specific number which is neither a prime factor of the pattern length of the data pattern nor its integral multiple, for example, in the case of a PN pattern, a power of 2. Also in this instance, it is possible to provide synchronization in a short time and presume a maximum time therefor on a basis of an equation similar to Eq. (1) mentioned previously.

Incidentally, the D-type flip-flop 34 may also be substituted with an RS flip-flop, which is set by the output pulse Pn of the frequency divider 33 and reset by the output pulse Pk of the frequency divider 31. In the instance where the clock Co is also provided from outside together with the data pattern Di, the clock regenerator 24 is naturally unnecessary.

Figure 5:
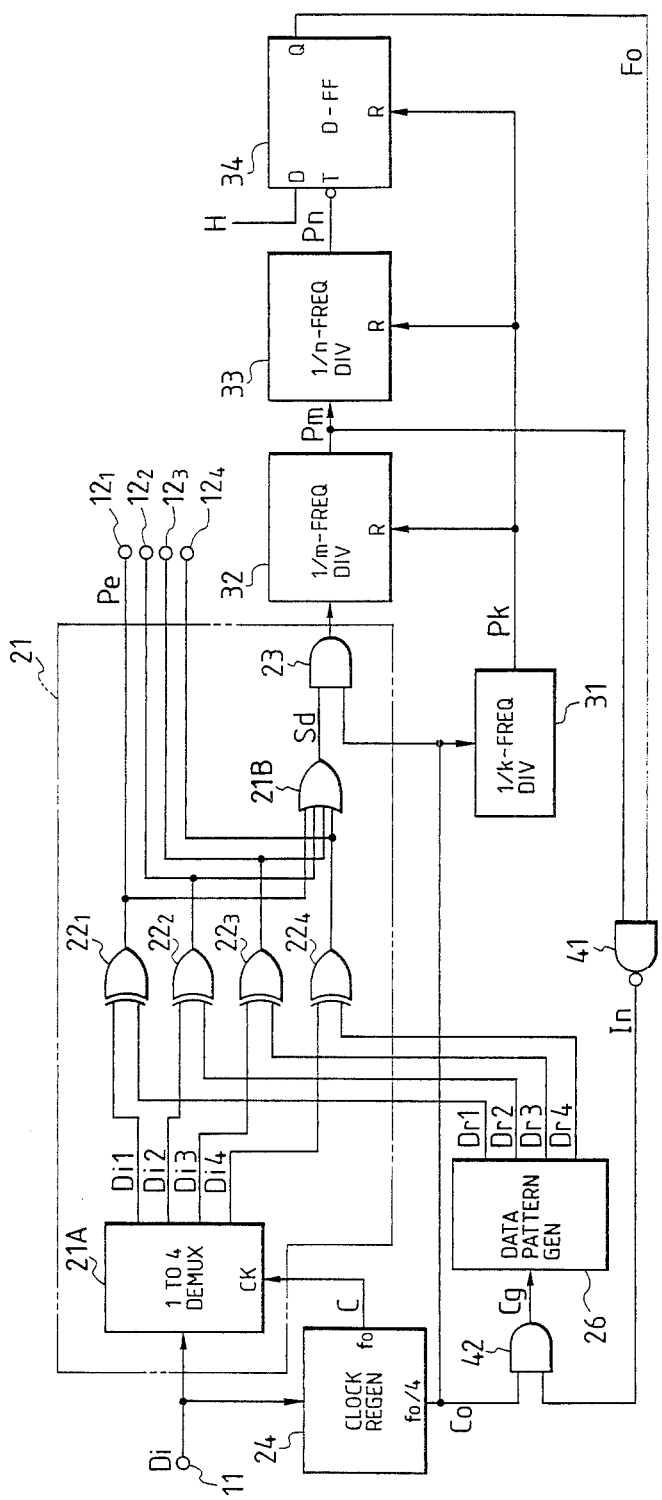
FIG. 5 is a block diagram illustrating another embodiment of the present invention.

FIG. 5 illustrates another embodiment of the data pattern synchronizer of the present invention adapted for synchronizing the reference data pattern with an input data pattern of pseudo-random data. This embodiment is basically identical in construction with the embodiment shown in FIG. 3 but designed for handling an input data pattern of as high a bit rate as about 4 GHz.

In this embodiment the input pseudo-random pattern is demultiplexed into four signal sequences to lower the bit rate down to ¼ (that is, 1 GHz for each signal sequence), thereby simplifying the circuit arrangement used.

The pseudo-random data pattern Di from the transmission system is provided to the clock regenerator 24, by which are regenerated a clock C of a frequency $f_0$ equal to the bit rate of the input data pattern and the clock Co to which the clock C has been frequency divided down. The input data pattern Di is also provided to a demultiplexer 21A of the data disagreement detector 21, wherein it is distributed to four sequences, in this example, bit by bit in synchronization with the clock C, producing four output data $Di_1$, $Di_2$, $Di_3$ and $Di_4$. The output data $Di_1$ to $Di_4$ thus obtained each have a bit rate ¼ that of the input data Di. It is well-known in the art that these output data $Di_1$ to $Di_4$ are all provided in the same pseudo-random data pattern as the input data pattern Di. But the output data $Di_1$ to $Di_4$ are displaced a fixed angle apart in phase.

The ¼ frequency-divided clock Co from the clock regenerator 24 is applied via the gate 42 to the data pattern generator 26. The data pattern generator 26 generates, in synchronization with the clock Co, the same pseudo-random data patterns as the error-free input data pattern and outputs them as reference pseudo-random data patterns $Dr_1$ to $Dr_4$ of the same phase shifts as those of the data patterns $Di_1$ to $Di_4$ from the demultiplexer 21A. These data patterns $Di_1$ to $Di_4$ and $Dr_1$ to $Dr_4$ are applied, in a one-to-one relationship, to comparators $22_1$ through $22_4$, wherein they are compared with each other. Each comparator yields a high-level output in the case of disagreement and a low-level output in the case of agreement. The compared output is applied as the detection signal Sd via an OR gate 21B to the AND gate 23, from which it is provided, as an error detection signal synchronized with the clock Co, to the frequency divider 32. The frequency dividers 31, 32 and 33 are identical in operation with those in FIG. 3 and the flip-flop 34 and the gates 41 and 42 are also identical in operation with those in FIG. 3. Consequently, when the disagreement detection signal Sd is produced in excess of m·n in the period of generation of k clock pulses Co, it is determined that the input data patterns $Di_1$ to $Di_4$ and the reference data patterns $Dr_1$ to $Dr_4$ are asynchronous with each other. As a result of this, the Q output Fo of the flip-flop 34 goes low-level, after which, upon generation of every mth disagreement detection signal Sd, the gate 42 is disabled to thin out or skip over the clock Cg, thereby delaying the generation of the reference data patterns $Dr_1$ to $Dr_4$ in the data pattern generator 26. The delaying of the generation of the data patterns is repeated until the error rate goes below a predetermined value, and as a result, the reference data patterns $Dr_1$ to $Dr_4$ are synchronized with the input data patterns $Di_1$ to $Di_4$. Following this, disagreement signals which are provided at output terminals $12_1$ to $12_4$ are counted by counters (not shown) for a predetermined period of time, and the sum of the count values is regarded as the number of errors contained in the input pseudo-random pattern in the period concerned. The demultiplexer 21A is usually a 1-to-$2^h$ (where h is a positive integer greater than one) demultiplexer and has $2^h$ outputs accordingly. Consequently, $2^h$ comparators 22 are provided and the data pattern generator 26 also yields $2^h$ pseudo-random patterns sequentially displaced apart in phase.

As described above, the present invention affords reduction of the time for providing synchronization and permits accurate calculation of a maximum time therefor. In addition, the present invention dispenses with a special inhibit pulse generator which randomly modulates the pulse width of the inhibit pulse, and hence permits simplification of the circuit arrangement used.

It will be apparent that many modifications and variations may be effected without departing from the scope of the novel concepts of the present invention.

What is claimed is:

1. A data pattern synchronizer comprising:
    data pattern generating means for generating a reference data pattern in response to a clock synchronized with an input data pattern;
    data disagreement detecting means which compares, bit by bit, the input data pattern to be measured for its error rate and the reference data pattern and yields a data disagreement detection pulse when the input data pattern and the reference data pattern are not in agreement with each other;
    first frequency dividing means for frequency dividing the clock down to 1/k, k being a positive integer;
    second frequency dividing means which is reset by the output pulse of the first frequency dividing means and frequency divides the data disagreement detection pulse down to 1/m, m being a positive integer smaller than k;
    third frequency dividing means which is reset by the output pulse by the first frequency dividing means and frequency divides the output pulse of the second frequency dividing means down to 1/n, n being selected so that it is smaller than k and $m \cdot n < k$;
    flip-flop means which is placed in a first stable state by the output pulse of the third frequency dividing means and in a second stable state by the output pulse of the first frequency dividing means;
    first gate means for producing an inhibit pulse based on the output pulse of the second frequency dividing means and the first or second stable state of the flip-flop means; and
    second gate means responsive to the inhibit pulse to inhibit the supply of the clock to the data pattern generating means.

2. The data pattern synchronizer of claim 1, wherein the data disagreement detecting means includes comparing means for comparing the input data pattern and the reference data pattern on a bitwise basis.

3. The data pattern synchronizer of claim 2, further comprising clock generating means for deriving from the input data pattern the clock of a frequency equal to its bit rate.

4. The data pattern synchronizer of claim 1, which further comprises clock generating means for generating a first clock of a frequency equal to the bit rate of the input data pattern and a second clock obtained by frequency dividing the first clock down to $\frac{1}{2}^h$, h being an integer greater than 1, and wherein the data disagreement detecting means includes demultiplexer means for demultiplexing the input data pattern into $2^h$ data pattern sequences in synchronization with the first clock, $2^h$ comparing means each supplied at one input with one of the $2^h$ data pattern sequences, and logical OR means for ORing the compared outputs of the comparing means and yielding the logical OR as the data disagreement detection pulse, and wherein the data pattern generating means generates, in synchronization with the second clock, $2^h$ reference data patterns sequentially displaced apart in phase but having the same waveform and applies them to the other inputs of the comparing means.

5. The data pattern synchronizer of claim 4, wherein the reference data patterns generated by the data pattern generating means are pseudo-random data patterns.

* * * * *

UNITED STATES PATENT AND TRADEMARK OFFICE
CERTIFICATE OF CORRECTION

PATENT NO. : 4,878,233
DATED : OCTOBER 31, 1989
INVENTOR(S) : MISHIO HAYASHI

It is certified that error appears in the above-identified patent and that said Letters Patent is hereby corrected as shown below:

TITLE PAGE [57] ABSTRACT, line 10, "1/-n" should be --1/n- --.

Col. 1, line 17, "reference," should be --reference--.

Col. 2, line 7, "1/1" should be --$1/\ell$--;
line 10, "1/1 (where 1" should be --$1/\ell$ (where $\ell$--;
line 11, "1" should be --$\ell$--;
line 16, "P1."should be --$P\ell$.--;
line 19, "1/k," should be --$\ell/k$,--;
line 20, "1/k," should be --$\ell/k$,--;
line 23, "P1" should be --$P\ell$--.

Col. 3, line 10, "1" should be --$\ell$--.

Col. 5, line 56, "1" should be --$\ell$--.

Signed and Sealed this

Fourth Day of September, 1990

*Attest:*

HARRY F. MANBECK, JR.

*Attesting Officer*     *Commissioner of Patents and Trademarks*